United States Patent
Huang

(10) Patent No.: US 7,298,363 B2
(45) Date of Patent: Nov. 20, 2007

(54) INNOVATED KEYBOARD FOR PERSONAL DIGITAL ASSISTANT

(76) Inventor: Chin-Lang Huang, No. 70-13 Hsichow, Changhsing Village, Luchu Hsiang, Taoyuan Hsien (TW)

( * ) Notice: Subject to any disclaimer, the term of this patent is extended or adjusted under 35 U.S.C. 154(b) by 608 days.

(21) Appl. No.: 10/901,143

(22) Filed: Jul. 29, 2004

(65) Prior Publication Data
US 2006/0022946 A1 Feb. 2, 2006

(51) Int. Cl.
*G09G 5/00* (2006.01)
(52) U.S. Cl. .................................. 345/168; 400/488
(58) Field of Classification Search ................ 345/168; 400/488, 472; 341/22; 200/5 A
See application file for complete search history.

(56) References Cited

U.S. PATENT DOCUMENTS 5,574,481 A * 11/1996 Lee .......................... 345/168
6,552,281 B2 * 4/2003 Katakami et al. ............ 200/5 A
6,793,421 B1 * 9/2004 Baldwin et al. ............. 400/488

* cited by examiner

*Primary Examiner*—Richard Hjerpe
*Assistant Examiner*—Kevin M Nguyen
(74) *Attorney, Agent, or Firm*—Rosenberg, Klein & Lee

(57) ABSTRACT

An innovated design of keyboard for keying in commands to a PDA, particularly a collapsible type that can be folded for storage and convenient carrying purposes, and its two sides can be unfolded and compressed to a fixed status to minimize measurements, which comprising a left keyboard and a right keyboard, and a connecting board to enable connection of the left keyboard with a mobile track plate, forming a foldable and movable joint. Furthermore, provided on one side of the mobile bottom plate of the right keyboard and between two recesses is a formation of a protruded insert, thereby when the right keyboard and the left keyboard are pushed and inserted in position, the protruded insert on the mobile bottom plate of the right keyboard is inserted into the insert groove on the bottom plate of the left keyboard.

1 Claim, 4 Drawing Sheets

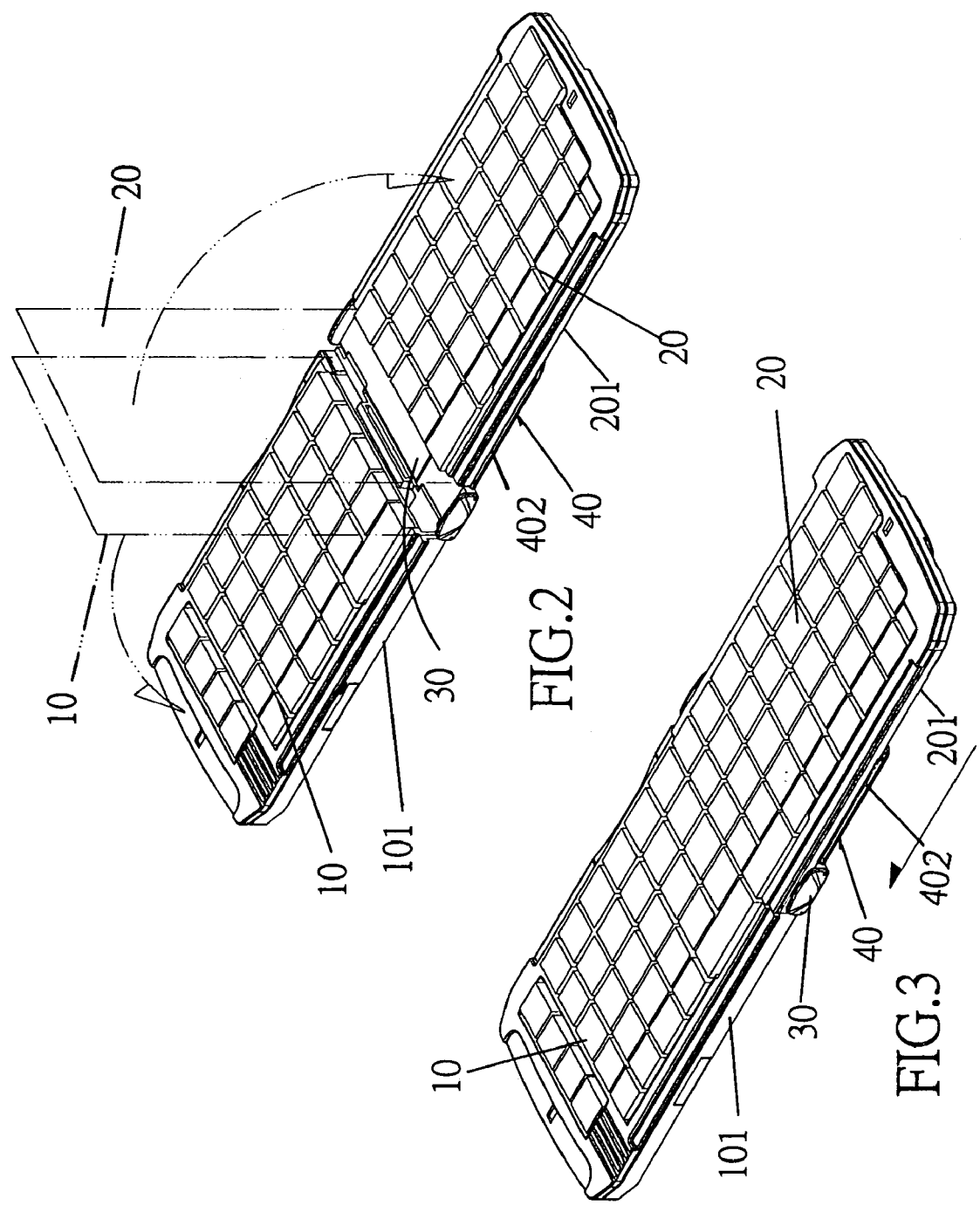

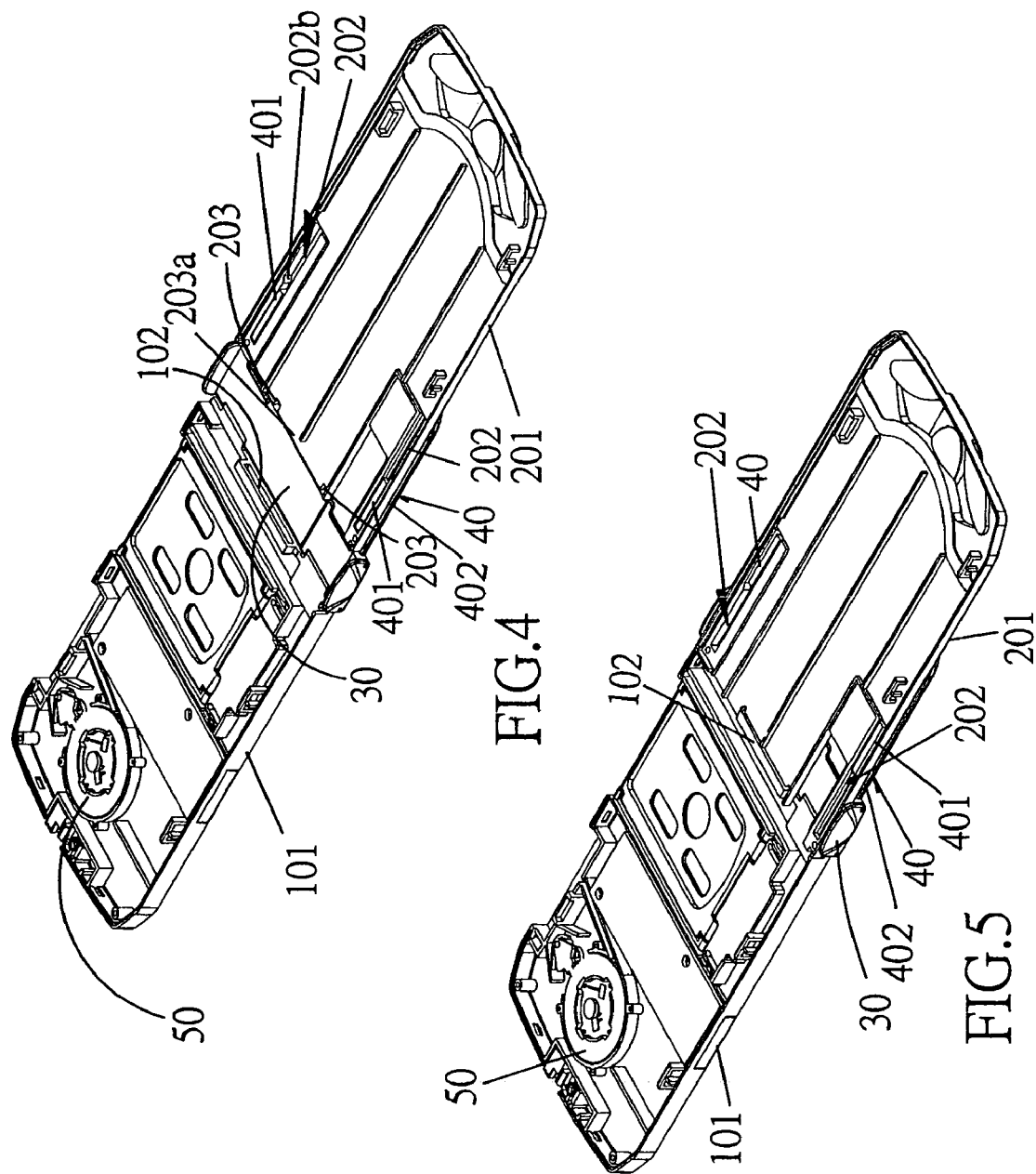

INNOVATED KEYBOARD FOR PERSONAL DIGITAL ASSISTANT

BACKGROUND OF THE INVENTION

1. Field of the Invention

The present invention relates to an innovative keyboard for a personal digital assistant, particularly a PDA key-in keyboard that can be folded for storage and convenient carrying, and unfolded for ready use, designed to reduce its measurements to enhance integrity and perfection.

2. Description of the Related Art

The personal digital assistant, PDA, has become a modern-day star in our information industry. It has the function and characteristics to provide uses with convenient use in different occasions, space and time, which is quite suitable for processing personal affairs or jobs.

Wherein, the interior system provides functions almost similar to those of a miniature personal computer, for communication and other purposes, including consumer electronics, word processing, information transmission, etc., all of which are functions of a desk-top computer. Therefore, it was quite welcome to the public. The word key-in system provides a word identification function, by writing directly on a PDA panel with a touch pen, which is identified by the system and automatically keyed into the computer.

Due to the slow speed when a touch-pen is used to key in on a PDA panel, a user would choose to use a keyboard for better efficiency when trying to key in a large amount of text. The keyboard comes in either an elongated rectangular shape or a foldable type for convenient carrying with the user. The foldable keyboard consists of two main keyboard units that are connected by a connecting board to form a mobile joint. The two keyboard units can be folded to facilitate carrying, or unfolded for ready use. The connecting board between the two keyboard units forms a distance, causing the user some difficulty in manual operation. Another shortcoming is its larger measurements, occupying a larger space when it is unfolded.

SUMMARY OF THE INVENTION

The present invention relates to an innovated keyboard for personal digital assistant, an innovated design of keyboard for keying in commands to a PDA, particularly a collapsible type that can be folded for storage and convenient carrying purposes, and its two sides can be unfolded and compressed to a fixed status to minimize measurements, which comprising a left keyboard and a right keyboard, and a connecting board connecting with the left keyboard with a mobile track plate, forming a foldable and movable joint, wherein, provided on an upper and lower edges of a mobile track plate is a protruded guide strip, and on an upper and lower position is a protruded track, accommodating insertion of a track groove on a mobile bottom plate of the right keyboard for to-and-fro movement, there being a protruded guide strip guiding the mobile bottom plate and keep it from wobbling, provided at a specified position on a bottom plate of the left keyboard being a recoil device, and on one side of the bottom plate being an insert groove; wherein, provided respectively on an upper and lower position of the mobile bottom plate of the right keyboard being a track groove, the track groove having an inlet, a track strip and a guide incline, permitting insertion of the protruded track on the mobile bottom plate through the inlet, the guide incline guiding the protruded track to join smoothly with the track strip for to-and-fro movement.

Furthermore, provided on one side of the mobile bottom plate of the right keyboard and between two recesses is a formation of a protruded insert, thereby when the right keyboard and the left keyboard are pushed and inserted in position, the protruded insert on the mobile bottom plate of the right keyboard is inserted into the insert groove on the bottom plate of the left keyboard.

BRIEF DESCRIPTION OF THE DRAWINGS

FIG. 2 is an exterior view of the present invention of keyboard when unfolded.

FIG. 3 is an exterior view of the invention of keyboard when two sides are compressed and joined.

FIG. 4 is a schematic view of the present invention of keyboard when unfolded.

FIG. 5 is a schematic view of the invention of keyboard when two sides are compressed and joined.

DETAILED DESCRIPTION OF THE PREFERRED EMBODIMENT

Figure 1:
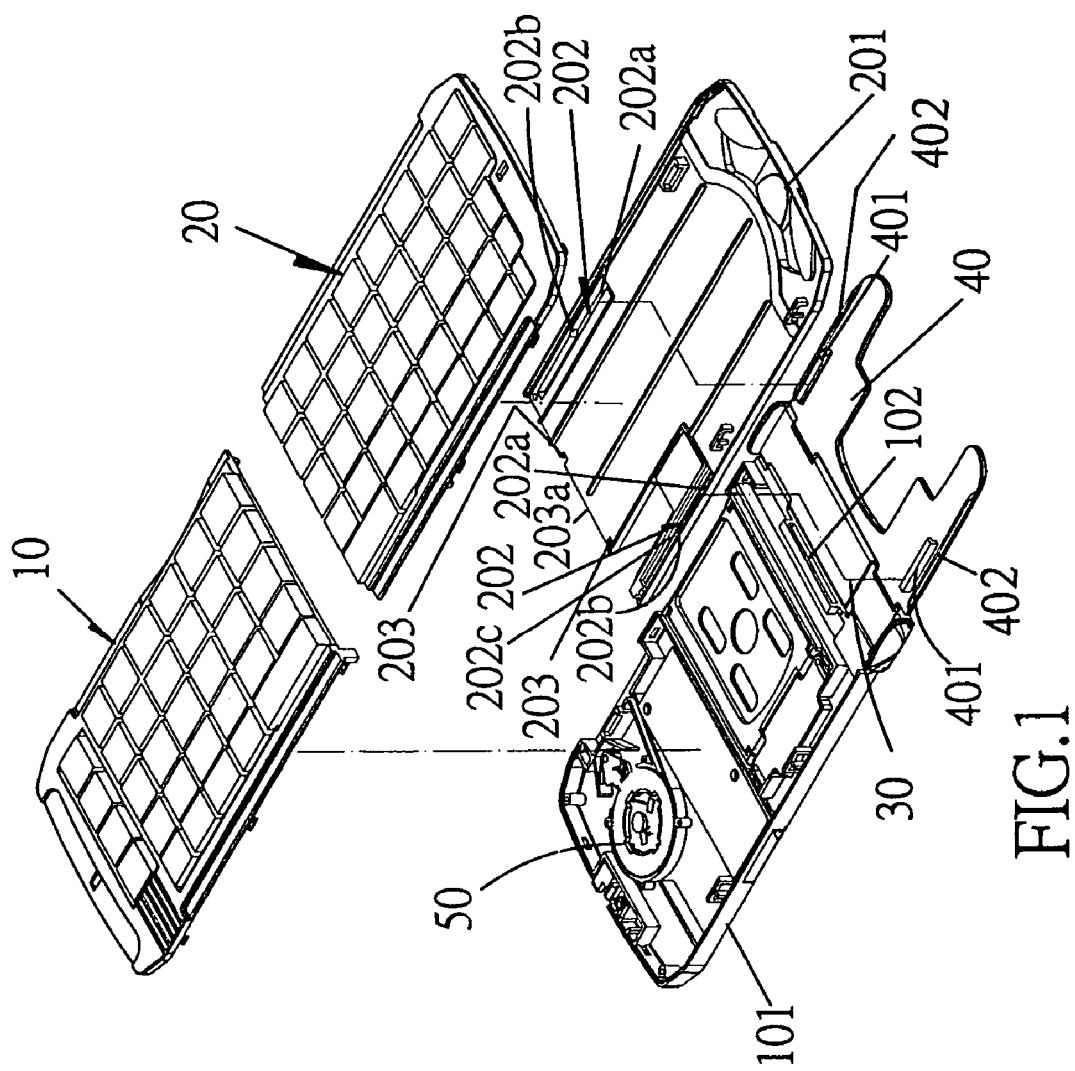
FIG. 1 is an exploded view of the present invention.
Figure 1A:
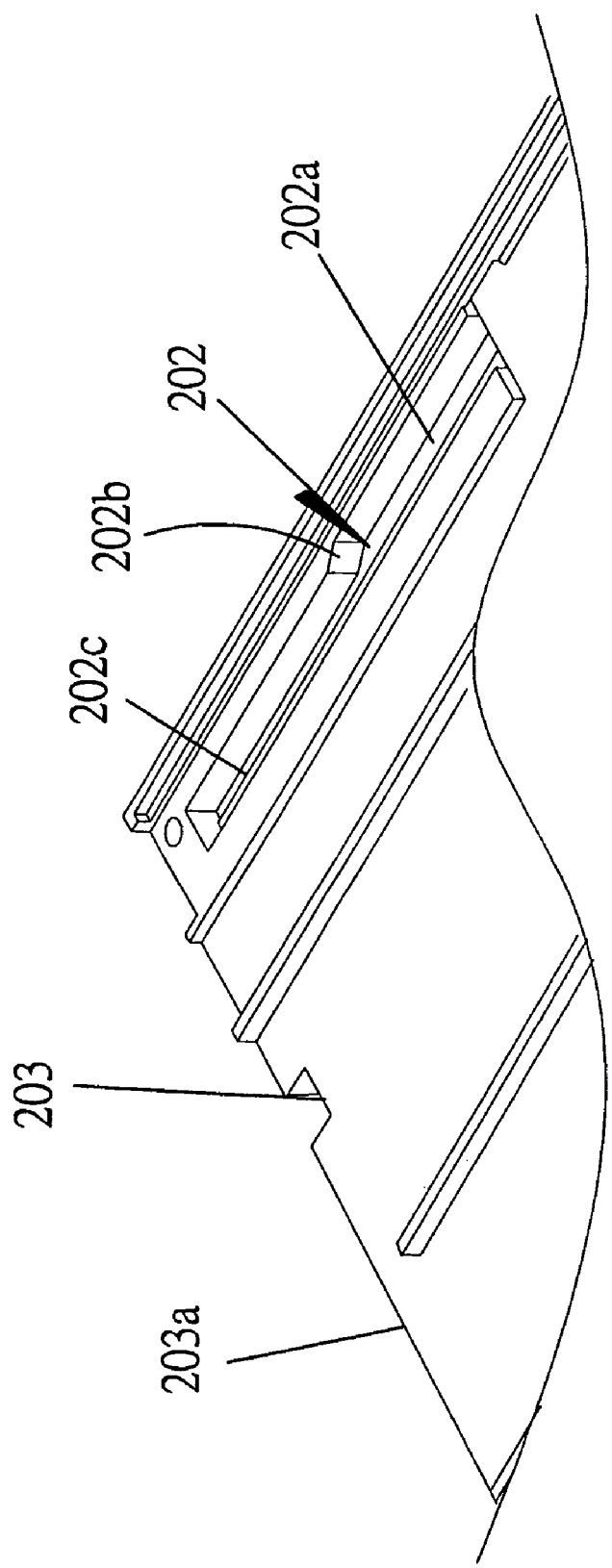
FIG. 1A is a partially blow-up view of the mobile bottom plate of the invention.

The present invention is an innovated keyboard for personal digital assistant (FIG. 1), consisting of a left keyboard 10 and a right keyboard 20, and a connecting board 30 to enable connection of the left keyboard 10 with a mobile track plate 40, forming a foldable joint; wherein, provided on the upper and lower edges of the mobile track plate 40 are protruded guide strips 402 and on the upper and lower positions are protruded tracks 401, permitting insertion in a track groove 202 (FIGS. 1 and 1A) on a mobile bottom plate 201 of the right keyboard 20 for reciprocal movement (FIGS. 4 and 5), and a protruded guide strip 402 guiding the mobile bottom plate 201 and preventing it from wobbling. Provided on a bottom plate 101 (FIGS. 1, 4 and 5) of the left keyboard 10 is a recoil device 50, and provided on a side of the bottom plate 101 is an insert groove 102; (FIGS. 1 and 1A) wherein, the mobile bottom plate 201 of the right keyboard 20 has a track groove 202 respectively on an upper and a lower position, (FIG. 1A), the track groove 202 has an inlet 202a, a track strip 202c and a guide incline 202b to accommodate the insertion by compression of the protruded track 401 of the mobile track plate 40 through the inlet 202a (FIGS. 1, 1A, 2, 3, 4 and 5), the guide incline 202b guiding smooth insertion of the protruded track 401 and the track strip 202c to move to and fro.

Furthermore, on one side of the mobile bottom plate 201 of the right keyboard 20 (FIGS. 1A, 4 and 5) and between two recesses 203 is the formation of a protruded insert 203a, when the right keyboard 20 and the left keyboard 10 are inserted to each other in position, the protruded insert 203a on the mobile bottom plate 201 of the right keyboard 20 is inserted into the insert groove 102 on the bottom plate 101 of the left keyboard 10.

FIGS. 2 and 3 illustrate the schematic view of the present invention of keyboard in operation. As shown, after the left and right keyboards 10,20 are unfolded, the right keyboard 20 is pressed to join the left keyboard 10 (refer to FIGS. 4 and 5). After the protruded track 401 of the mobile track plate 40 is moved into position in the track groove 202 on the mobile bottom plate 201 of the right keyboard 20, the protruded insert 203a on the mobile bottom plate 201 of the right keyboard 20 is inserted into the insert groove 102 on the bottom plate 101 of the left keyboard 10, thereby the two parts of keyboard are fastened to reduce measurements.

As evidenced above, the structure of the present invention is capable of moving the left and right parts of keyboard and inserting them into each other to reduce measurements. That characteristic has not yet been used or disclosed in public. Therefore, this application is filed for a patent right. Your favorable consideration shall be appreciated.

While the particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

What the invention claimed is:

1. An innovative keyboard for personal digital assistant comprising:
   a left keyboard;
   a right keyboard;
   a connecting board connecting with the left keyboard with a mobile track plate forming a foldable and movable joint;
   a protruded guide strip is provided on upper and lower edges of the mobile track plate;
   a protruded track is disposed on an upper and lower portion of the mobile track plate, accommodating insertion of a track groove on a mobile bottom plate of the right keyboard for to-and-fro movement, the protruded guide strip guiding the mobile bottom plate and preventing it from wobbling;
   a recoil device provided at a predetermined position on a bottom plate of the left keyboard; and
   an insert groove disposed on one side of the bottom plate;
   a track groove provided respectively on an upper and lower position of the mobile bottom plate of the right keyboard, the track groove including;
   an inlet;
   a track strip;
   a guide incline, permitting insertion of the protruded track on the mobile bottom plate through the inlet, the guide incline guiding the protruded track to join smoothly with the track strip for to-and-fro movement; and
   a formation of a protruded insert is disposed on one side of the mobile bottom plate of the right keyboard between two recesses, whereby when the right keyboard and the left keyboard are pushed and inserted in position, the protruded insert on the mobile bottom plate of the right keyboard is inserted into the insert groove on the bottom plate of the left keyboard.

* * * * *